June 22, 1971 R. E. AYRES 3,586,748
CONTAINER FORMING METHOD
Original Filed Aug. 24, 1966 2 Sheets-Sheet 1
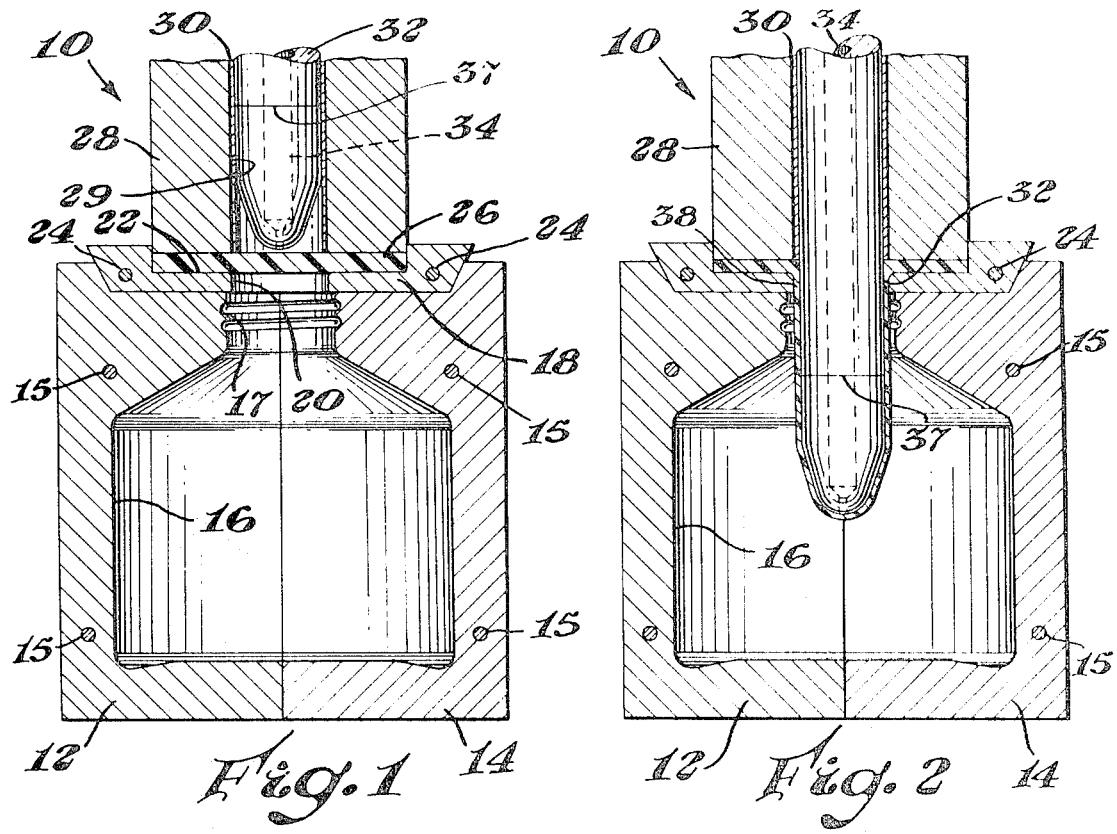
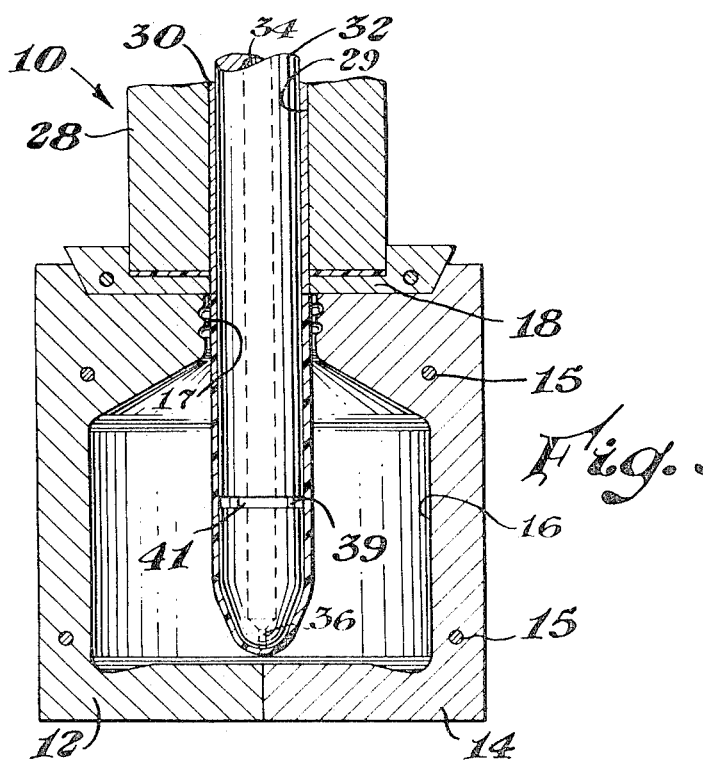
INVENTOR.
Ralph E. Ayres
BY Lloyd E. Hessenaur
ATTORNEY

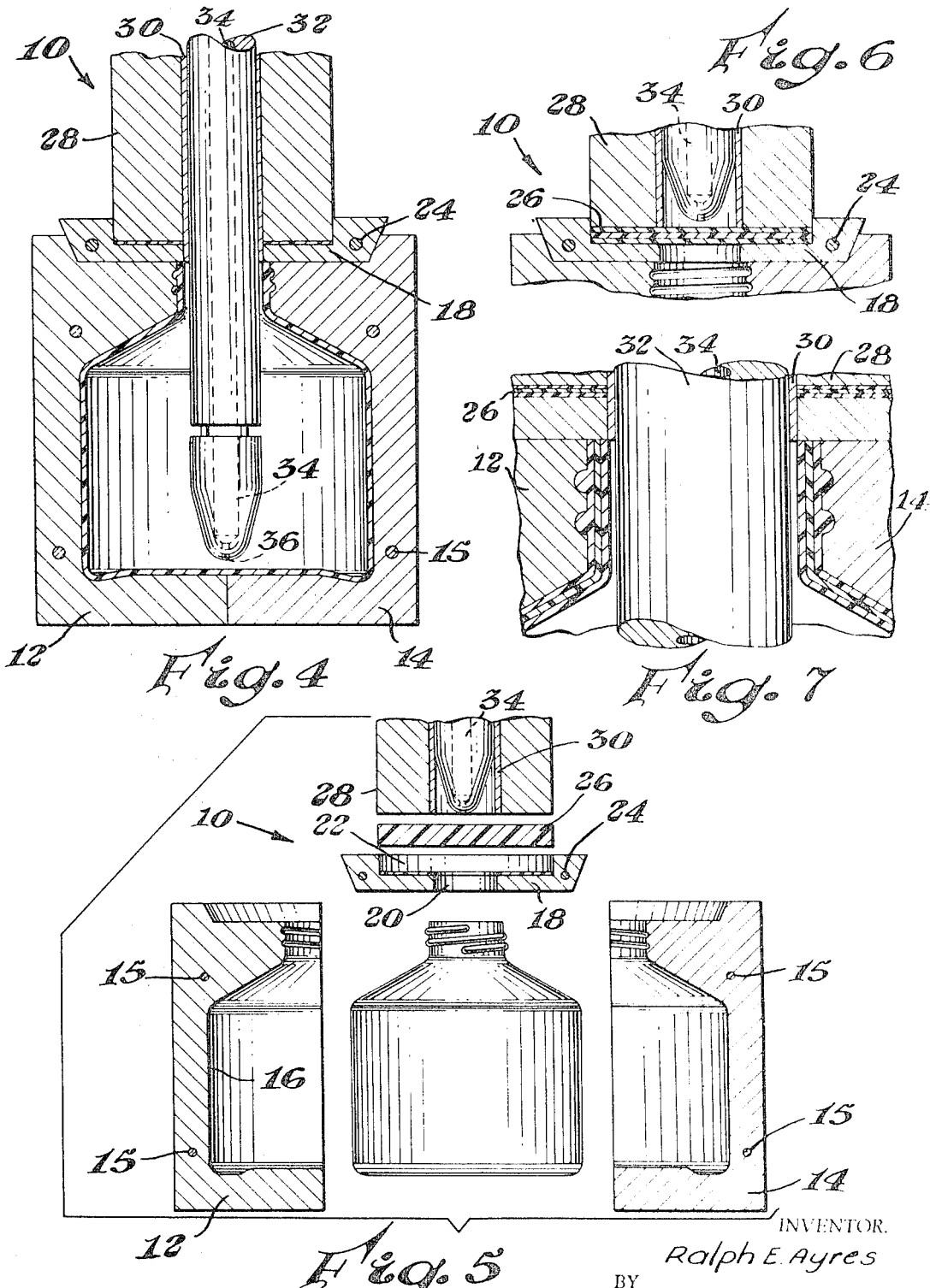

United States Patent Office 3,586,748
Patented June 22, 1971

3,586,748
CONTAINER FORMING METHOD
Ralph E. Ayres, Midland, Mich., assignor to The Dow Chemical Company, Midland, Mich.
Original application Aug. 24, 1966, Ser. No. 574,757, now Patent No. 3,496,597, dated Feb. 24, 1970. Divided and this application Nov. 29, 1968, Ser. No. 807,143
Int. Cl. B29c 17/04
U.S. Cl. 264—98     6 Claims

ABSTRACT OF THE DISCLOSURE

Method for extrusion forming a preform into a tubular closed end extrusion which is trim-free. In the extrusion process a lug pushes a heated preform through a relatively small aperture in the middle of a die plate, the plug causing the preform to flow from the outside towards the middle of the die plate to form the extrusion through the aperture. The trim-free closed end tubular extrusion can be employed as a parison for a blow molded container having a narrow neck.

---

This application is a division of U.S. application Ser. No. 574,757, filed Aug. 24, 1966, now U.S. Pat. No. 3,496,597.

This invention relates generally to the making of blow molded containers and other articles and, more particularly, to a method for substantially scraplessly forming of blow molded articles without the requirement of an in-line extruder or injection molding apparatus.

The usual prior arrangements for achieving a blow molded container generally require the use of a plastic extruder such as that shown in U.S. Pat. No. 3,120,679, for example, or a direct-in-line plastic injection molding apparatus, as typified by U.S. Pat. No. 3,170,970. Such arrangements require the blow molding fabricator to have relatively expensive extruding or injection molding apparatus on the premises and often involved considerable scrap and trim in their use. A prior arrangement which has tried to get around the need for such direct-in-line apparatus is sometimes known as the "cold tube process." Here a continuous length of pipe is cut to appropriate lengths, which lengths are later reheated, clamped in a mold and blow molded much as in extrusion blow molding. However, this process has not been completely satisfactory because the preformed parison must be made to especially close tolerances and substantial scrap is generated.

The present invention has accomplished the desirable result of using substantially all of the resin put into the apparatus for production of blow molded articles and produces trim-free articles, all without requiring a direct-in-line extruder or injection molding apparatus.

Briefly, the present invention comprises the placing into a die of a relatively simple-shaped preform of a quantity of the polymeric resin which is needed for a given blow mold cycle. The preform is heated, compressed, extruded and guided into the shape of a parison. The parison can then be blown into the desired configuration as defined by the cavity or cavities of the blow mold. As more articles are desired, additional preforms are put into the die and a like procedure is followed for each subsequent mold cycle. By various techniques, the present invention can be employed to supply articles formed of one resin material, multi-layered different resins, layered combinations of resinous and non-resinous materials, impregnated or filled resinous materials, and the like.

Yet additional objects and advantages of the present invention are even more apparent when taken in conjunction with the accompanying drawing in which like characters of reference designate corresponding material and parts throughout the several views thereof, in which:

FIG. 1 is a fragmentary, schematic vertical sectional view of a preferred embodiment of the apparatus of this invention with a preformed disc located therein but prior to any forming thereof;

FIG. 2 is a view similar to FIG. 1 illustrating the disc in a partially formed configuration;

FIG. 3 is a view like FIG. 1 illustrating the disc formed into a full parison;

FIG. 4 is a view like FIG. 1 only with the parison being blown to the shape of a blow mold cavity to provide a desired scrapless article;

FIG. 5 is a view like FIG. 1, only exploded, after the article is fully formed and released from the blow mold, and just as another disc is being inserted in the apparatus for the making of the next article;

FIG. 6 is a view like FIG. 1 only further fragmented and employing a multi-layered preformed disc; and FIG. 7 is an enlarged fragmentary view showing an article formed in the blow mold from a multi-layered disc.

Referring to the drawings in more detail, an apparatus 10 includes blow mold die halves 12 and 14 each including part of a mold cavity 16, the cavity 16 defining the configuration of a container eventually to be formed. In this particular embodiment the container is a bottle, the neck portion 17 thereof being at the top of the mold halves 12 and 14. Cooling fluid passageways 15 are usually provided in the mold halves to minimize the period of time necessary for the material comprising the bottle to set once blown against cavity 16.

Set within the top portion of the mold halves 12 and 14 is a die insert plate 18. Plate 18, as shown, has a circular aperture 20 located in the center thereof and a circular recess 22 in the upper part thereof and concentric with the aperture 20. Heating of the die 18 can be accomplished by passing hot fluid through the hole 24 extending thereabout.

Shown positioned in recess 22 is a disc 26 which is a molded relatively flat preform i.e., the preform is wider than it is tall, containing substantially enough resin, such as natural bottle grade polyethylene, or other material to completely form the bottle, as defined by the mold cavity 16 of the mold halves 12 and 14. The recess 22 is of a dimension adequate to receive the disc 26.

Engaged with the top of the disc 26 is a hollow piston 28 adapted to fit closely within the recess 22 of the die 18. Hollow 29 of the piston is concentric with the hole 20. Axial movement (upwardly and downwardly) of the piston 28 can be achieved by any well-known mechanism (not shown).

In the hollow 29 of the piston 28 is a cut-off sleeve 30 which also is adapted to be movable axially by a well-known mechanism (not shown) but, preferably, independently of the movement of the piston 28. The outer diameter of sleeve 30 is only slightly smaller than the diameters of hole and hollow 29, but sufficient to permit ready movement of the sleeve 30 with respect thereto.

Internally of the sleeve 30 is a mandrel 32 also capable of axial movement within the sleeve 30, and preferably independently thereof, and of the piston 28 (again by a well-known mechanism not shown). The mandrel 32 includes an axial hole 34 converging to an opening 36 at the bottom of mandrel 32, such hole 34 being connected to a source of air pressure, not shown. Mandrel 32 is laterally split at 37 such that when it comes time to blow, it separates via axially movable pins 39 to present a passageway 41 in open communication with hole 34 to distribute better the blowing air. Of course, other passageway systems for distributing the air might be employed instead, but it has been found that the above arrangement works especially well in the type of blowing involved in the present invention. When the mandrel 32 is in its extended position there is a gap 38 between it and the aperture 20, for reasons which will be explained hereinafter.

In the operation of apparatus 10, disc 26 is heated to a temperature whereby it can be formed into an article, which temperature in each instance will be dependent upon the particular type of material (discussed later) employed in forming the desired article. The disc 26 can be preheated before entering the recess 22, the heat from plate 18 permitting the temperature to be maintained if needed, or it can be heated by the plate 18 itself, depending on the material and speed desired. In FIG. 2 the piston 28 and sleeve 30 have moved partially downwardly through the aperture 20 thereby driving the heated material of disc 26 toward the center of the mold halves 12 and 14. Simultaneously, the mandrel 32 moves downwardly into the recess and through aperture 20 causing extrusion of the material thereof through gap 38 formed between mandrel 32 and aperture 20. The mandrel 32 is encased in the extruding material of the disc 26 and guides it downwardly into a parison shape.

This simultaneous movement of piston 28, sleeve 30 and mandrel 32 continues until a closed-end tubular extrusion or parison 40 is in a fully extended position as shown in FIG. 3. The wall thickness of the parison is determined by the annular gap 38 between the plate 18 and mandrel 32 and by the relative speeds of the piston 28 and sleeve 30 with respect to mandrel 32. The parison 40 can thus be programmed along its length by varying the relative speeds of the piston 28, sleeve 30 and mandrel 32 to give a controlled (uniform or otherwise) wall thickness in the blown bottle. After piston 28 stops, the sleeve 30 moves axially downwardly therefrom severing the parison 30 from the remaining stock of the disc 26 by the shearing action of the outside edge of the sleeve 30 against the inner periphery of the recess 22. However, it is also considered satisfactory if the sleeve 30 is held in its position axially in alignment with mandrel 32 until a later time, e.g., after blowing, before it descends to sever the parison 30.

In any event, after the parison is fully extended, blow air is then emitted through hole 34 to form the parison against the cavity wall 16. The resulting container is formed without scrap at its neck because the sleeve 30 extends down to the top of the neck portion 17 of the cavity 16 providing a finished top, and at its bottom because no pinch is necessary since the parison is formed as a closed end tube. A container requiring no supplemental trim operations is thus produced. The container can be ejected when the mold holves 12 and 14 open, as illustrated by FIG. 5, by a blast of additional air through mandrel hole 34.

The next container can be made by placing a second disc 26 in the recess 22 and performing the same steps as heretofore outlined above for the manufacture of the first container, as is just about to occur in FIG. 5. The small quantity of material remaining in the recess 22 from the first disc 26 is substantially merged with an pushed outwardly by the material of the second disc 26 as it is acted upon by piston 28. The heat from such second disc can aid in the merger and extrusion of such remaining material. Thus as each successive disc 26 substantially pushes the remainder of the preceding disc out into the next parison, no material waste from the process results except possibly from the last disc processed in a given run (which too might be later reheated and used). While it is conceivable that not all of the material of a preceding disc is pushed out by the immediately succeeding disc, any slight remainder is undoubtedly reduced even further by other subsequent discs as they are extruded. In any event, the amount extruded in each blow mold cycle is just sufficient for that cycle, the operation being considered scrapless since each disc thus represents a cycle and no subsequent trim operations are required.

To take full advantage of the above-described process the preforms should be of a fairly simple shape. One of the simplest shapes and one which fits the process well is a flat relatively thin circular disc, as described above. These can be easily made by a number of processes including cutting from extruded sheet, injection molding, compression molding from granules or powder, and casting. One such preform actually employed comprised a polyethylene resin in the form of a circular flat disc about three inches in diameter and about one-quarter inch thick. It resulted in a parison having a length of about five inches and a diameter of about one inch. Shapes other than circular might also be used, such as square, rectangular, or hexagonal. These other shapes would give an advantage in reduced scrap when they are cut from a flat sheet. The preforms can also be contoured in thickness, e.g., conical, to aid in distribution of material in the parison is such is desired or necessary.

Layered containers could also be formed by starting with multi-layered preforms cut from multi-layered extruded sheet, such as taught in French Pat. 1,424,703. The preforms might also be made by cutting thinner blanks from the various materials desired in the container, and bonding these together in the desired layered structure either by the natural compatibility of the materials themselves or by an adhesive between the layers. However, even if no bonding occurs, this would not appear to be especially disadvantageous in the present process since there is no pinch off or sprue at the bottom of the container which would invite leakage. To this extent, even non-bonded layers can be employed together to form a desired article. In any event, the layers maintain their integrity throughout the resulting article.

An excellent multi-layered container could be a polyethylene/saran composite to provide high vapor and gas barrier qualities. Other well-known resins might be used to achieve other obviously desirable barrier or non-reactant properties. Likewise different plastics with impact and modulus characteristics could be used to custom-make a bottle with the desired combination of impact strength and rigidity as, for example, a low impact strength/high rigidity polystyrene together with a high impact strength/low rigidity polyethylene. Likewise, a non-food approved outer layer resin might be used with a food approved inner layer resin for a given container. A low melting metal or metal alloy that is extremely ductile or near its liquid state at plastic forming temperatures might also be used in combination with certain thermoplastic materials to achieve desirable results for certain applications.

Other possible container properties might also be achieved by using a metalized plastic in the preform to provide a decorative bottle or to improve the barrier properties thereof. Also various decorative or information bearing layers could be included in the preform as could layers of different colors or transparency. If the preform comprised many especially thin layers of plastics with different indices of refraction, bottles could present a silvery or iridescent appearance. Likewise strands of materials such as glass fibers could be included in the preform to improve the toughness of the resulting containers. These and other modifications of the preform to achieve a desired result are all within the contemplation of the present invention.

If an orientable plastic material is used and the piston is rotated about its longitudinal axis while the parison is being formed, a bottle possessing multi-axial orientation can be formed. The squeezing of the plastic by the piston induces shear and orientation in the flow direction while rotation provides orientation in the hoop or circumferential direction. Orientation can also be achieved by rotating the mandrel about its longitudinal axis while the parison is being formed.

While certain representative embodiments and details have been shown for the purpose of illustrating the invention it will be apparent to those skilled in the art that various changes and modifications can be made therein without departing from the spirit and scope of the invention.

What is claimed is:

1. The method of producing molded articles comprising the steps of heating a preform of material to its forming temperature, said preform being relatively flat and comprising multiple layers of material at least sufficient to complete one mold cycle, said layers stacked one on top of the other up the height of said preform, compressing said preform at its periphery with a mandrel against a restraining means having an orifice while simultaneously pushing on an interior section of said preform, said mandrel exerting sufficient pressure against said restraining means to effect an extrusion of at least a substantial part of said preform through said orifice, which orifice is generally aligned with said interior section of said preform but of a lateral extent less than that of the preform, said compressing and pushing effecting a closed end tubular extrusion formed about said mandrel, the compression of said periphery and pushing of said interior section of said preform being at a relative rate whereby wall thickness in the extrusion is controlled, the layers maintaining their integrity throughout the resulting articles.

2. The method of claim 1 wherein said extrusion is subsequently blown into the configuration of a desired article by the introduction of a pressurized fluid into said extrusion.

3. The method of claim 1 wherein the top portion of said extrusion is severed from a remaining portion of said preform.

4. The method of claim 1 wherein another preform is compressed against the remaining portion of said first mentioned preform in a heated condition to merge the two together as compression of said other preform is continued in the same manner as that for said first mentioned preform, each of said preforms being relatively thin in height compared with its lateral extent.

5. The method of claim 1 wherein said article includes a threaded neck section, the compression of said preform being above said neck portion.

6. The method of claim 1 wherein said multilayered preform is cut from multilayered extruded sheet.

References Cited

UNITED STATES PATENTS

| | | | |
|---|---|---|---|
| 2,854,694 | 10/1958 | Mumford | 264—94 |
| 2,878,513 | 3/1959 | Slaughter | 264—97UX |
| 3,184,524 | 5/1965 | Whiteford | 264—97X |
| 3,203,218 | 8/1965 | Bolt et al. | 18—19X |
| 3,288,898 | 11/1966 | West | 264—97UX |
| 3,324,509 | 6/1967 | Hey et al. | 18—30X |
| 284,794 | 9/1883 | Allen | 264—209X |
| 2,863,174 | 12/1958 | Schuman et al. | 264—323 |
| 2,885,739 | 5/1959 | Staller | 264—241X |
| 3,223,761 | 12/1965 | Raley | 264—95 |

ROBERT F. WHITE, Primary Examiner

T. J. CARVIS, Assistant Examiner

U.S. Cl. X.R.

264—161, 323